(12) United States Patent
Robinson

(10) Patent No.: US 6,702,521 B2
(45) Date of Patent: Mar. 9, 2004

(54) PIPE REPLACEMENT APPARATUS

(76) Inventor: Gerald M. Robinson, 5708 Ewart St., Burnaby, British Columbia (CA), V5J 2W7

( * ) Notice: Subject to any disclaimer, the term of this patent is extended or adjusted under 35 U.S.C. 154(b) by 0 days.

(21) Appl. No.: 10/158,943

(22) Filed: Jun. 3, 2002

(65) Prior Publication Data

US 2003/0223823 A1 Dec. 4, 2003

(51) Int. Cl.⁷ .................................................. F16L 55/18
(52) U.S. Cl. ..................................... 405/184.3; 138/97
(58) Field of Search ................................ 405/156, 184, 405/184.3, 184.1, 154.1; 138/97

(56) References Cited

U.S. PATENT DOCUMENTS

| | | | |
|---|---|---|---|
| 1,519,882 A | | 12/1924 | Stewart et al. |
| 1,618,368 A | | 2/1927 | Dietle |
| 2,502,711 A | | 4/1950 | Evans |
| 2,638,165 A | | 5/1953 | Barber |
| 4,457,647 A | * | 7/1984 | Dusette et al. ............. 405/156 |
| 4,505,302 A | | 3/1985 | Streatfield et al. |
| 4,507,019 A | * | 3/1985 | Thompson ............... 405/184.3 |
| 4,626,134 A | | 12/1986 | Coumont |
| 4,637,756 A | | 1/1987 | Boles |
| 4,720,211 A | | 1/1988 | Streatfield et al. |
| 4,738,565 A | | 4/1988 | Streatfield et al. |
| 4,756,644 A | * | 7/1988 | Williams ................... 405/156 |
| 4,830,539 A | | 5/1989 | Akesaka |
| 5,013,188 A | | 5/1991 | Campbell et al. |
| 5,094,496 A | | 3/1992 | King, Sr. |
| 5,098,225 A | | 3/1992 | Rockower et al. |
| 5,127,481 A | * | 7/1992 | Hesse .......................... 405/156 |
| 5,211,509 A | | 5/1993 | Roessler |
| 5,403,122 A | * | 4/1995 | Granella .................. 405/184.3 |
| 5,507,597 A | * | 4/1996 | McConnell ................ 405/156 |
| 5,544,977 A | | 8/1996 | Cravy et al. |
| 5,580,188 A | * | 12/1996 | Nowak ..................... 405/184.3 |
| 5,597,192 A | | 1/1997 | Smith |
| 5,642,912 A | | 7/1997 | Parish, II |
| 5,647,627 A | | 7/1997 | Baessler |
| 5,816,745 A | * | 10/1998 | Tenbusch, II ............ 405/184.3 |
| 5,988,719 A | | 11/1999 | Lavender |
| 5,997,215 A | | 12/1999 | Schwert |
| 6,092,553 A | | 7/2000 | Hodgson |
| 6,149,349 A | | 11/2000 | Nikiforuk et al. |
| 6,171,026 B1 | | 1/2001 | Crane et al. |

* cited by examiner

*Primary Examiner*—Frederick L. Lagman
(74) *Attorney, Agent, or Firm*—Vermette & Co.

(57) ABSTRACT

The invention is a tool for replacing underground pipe. The tool has a nose coupler for coupling a pulling chain for pulling the tool through the underground pipe, a rear portion with a rear coupler for coupling a retaining chain, a plurality of breaking elements extending along the central longitudinal axis from the nose to the rear portion, and a plurality of nozzles on the rearward facing edges of the breaking elements, the nozzles operative to emit jets of high-pressure water against surrounding soil and fragments of the underground pipe.

22 Claims, 5 Drawing Sheets

PIPE REPLACEMENT APPARATUS

FIELD

The present invention relates to an apparatus for replacing underground pipe.

BACKGROUND

Underground pipes are subject to inevitable deterioration and wear and, therefore, must be replaced from time to time. An obvious method for replacing existing underground pipe is to excavate the entire length of the existing pipe, remove it and place new replacement pipe into the excavation. Excavation of existing pipe is time-consuming, labor-intensive and results in damage to the area surrounding the excavation. In many instances pipes often lie beneath driveways, buildings, or gardens, and property owners are very concerned about any damage that may result thereto. In addition, excavation is often made difficult by the presence of underground utilities.

Accordingly, it is an object of the present invention to provide an apparatus and method for replacing underground pipe requiring minimal excavation.

Other devices and methods have previously been proposed for use in replacement of underground pipes and mains. For example, those disclosed in U.S. Pat. No. 6,171,026 issued to Crane et al.; U.S. Pat. No. 6,092,553 issued to Hodgson; U.S. Pat. No. 5,544,977 issued to Crane et al.; U.S. Pat. No. 4,720,211 issued to Streatfield et al.; and U.S. Pat. No. 4,738,565 issued to Streatfield et al. However, all of the devices and methods disclosed by the above patents suffer from several drawbacks.

Often the earth surrounding underground pipes is extremely hard because it has been compacted or has settled over the years that the pipes have been in the ground. Many of the tools of the prior art, such as those described in U.S. Pat. No. 4,720,211 issued to Streatfield et al., and U.S. Pat. No. 5,098,225 issued to Rockower et al., involve the movement outwards of fragments of the existing underground pipe and expansion of the cavity thereof in order to create a cavity large enough to accommodate a replacement pipe. Obviously, in very compact earth, expansion of the cavity of the existing underground pipe can be very difficult and sometimes impossible. In addition, expansion of the existing underground pipe can damage nearby underground utilities or surface features (e.g. where an existing pipe passes under a sidewalk the sidewalk, may be cracked by expansion of the cavity of the existing pipe).

Therefore it is an object of the present invention to provide an apparatus and method for replacing underground pipe that permits the expansion of the cavity of the existing underground pipe in hard, compacted, or settled earth.

It is a further object of the present invention to provide an apparatus and method for replacing underground pipe that permits the expansion of the cavity of the existing underground pipe while minimizing the risk of damage to surrounding utilities.

It is a further object of the present invention to provide an apparatus and method for replacing underground pipe that permits the replacement of an existing underground pipe with a larger diameter replacement pipe.

SUMMARY OF THE INVENTION

The invention is a tool for replacing underground pipe. The tool has a nose with a nose coupler for coupling a pulling chain for pulling said tool through the underground pipe, a rear portion with a rear coupler for coupling a retaining chain, a plurality of breaking elements extending along the central longitudinal axis from the nose to the rear portion, a plurality of nozzles on the rearward facing edges of the breaking elements, the nozzles operative to emit jets of high-pressure water against the surrounding soil and fragments of the underground pipe.

Each of the breaking elements extends radially outwardly from the central longitudinal axis and defines a breaking edge, which is angled outwardly from said central longitudinal axis such that the distance between the breaking edge and the central longitudinal axis increases with the distance from the nose. The distance from the central longitudinal axis to the outermost point of the breaking elements is greater than the radius of the underground pipe. The breaking edges are operative to fracture the underground pipe as the tool is drawn therethrough. Each of the breaking elements additionally defines a rearward facing edge.

In one embodiment a high-pressure hose is coupled to a coupling point on the rear portion of the tool, and is operative to supply water to the nozzles. The high-pressure hose is drawn through the underground pipe behind said tool.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

The present invention comprises a tool for trenchless replacement of underground pipes. The tool is drawn through an existing underground pipe, in the process fracturing or cutting the existing underground pipe. The tool additionally washes away and/or softens the earth surrounding the existing underground pipe with high-pressure water emitted from nozzles directed rearwardly from the tool.

Figure 1:
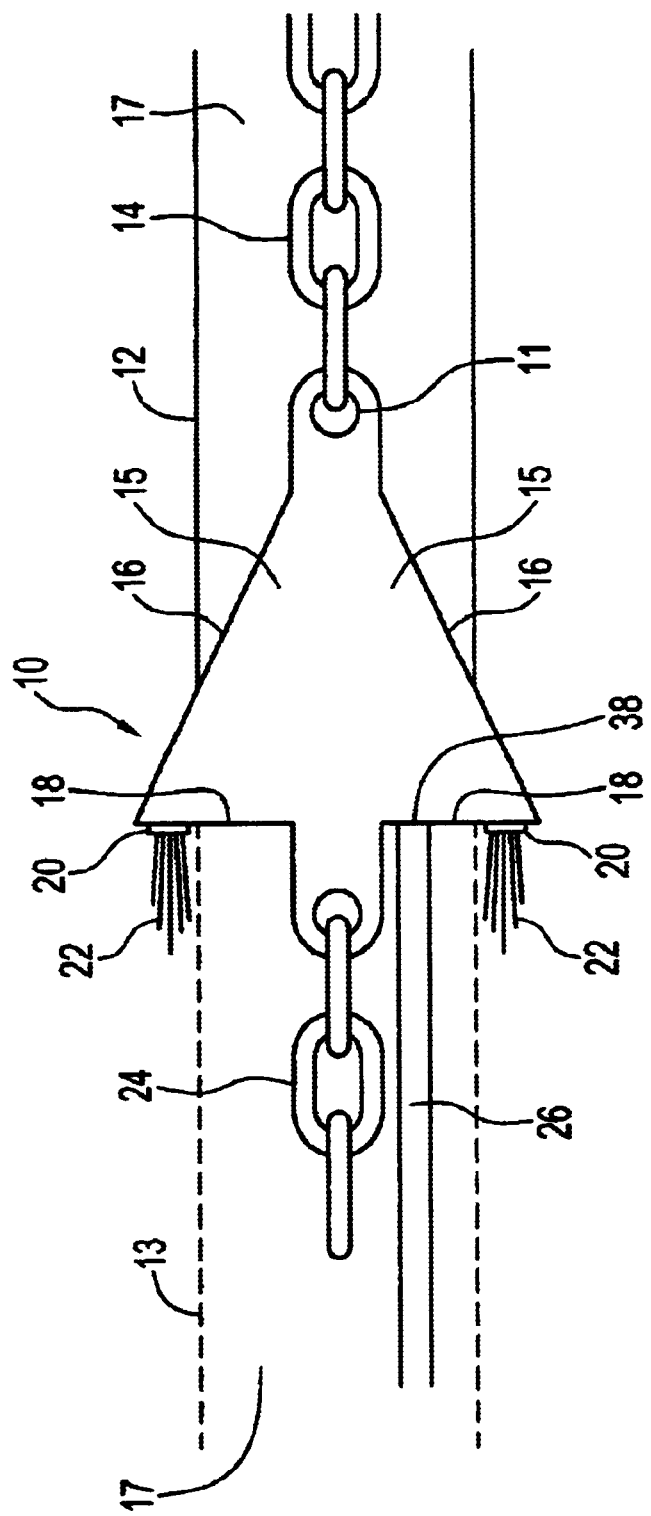
FIG. 1 is a side view of the tool of the present invention as it is being drawn through an underground pipe.

Referring to FIG. 1, the tool 10 is shown as it is being drawn through an existing underground pipe 12. As the tool 10 is moved forward, the existing underground pipe 12 is broken into fragments 13.

In the embodiment shown in FIG. 1, the tool 10 is drawn through the pipe 12 by pulling chain 14. Pulling chain 14 is coupled to nose coupler 11. Tool 10 has two breaking elements 15 each having a breaking edge 16 that extends rearwardly and outwardly from the nose of the tool 10. As the tool 10 is drawn through pipe 12 by pulling chain 14, the breaking edges 16 are forced against the walls of the pipe 12, causing them to break. In an alternative embodiment the breaking edges 16 are operative to cut the walls of the pipe 12. On the rearward facing edge 18 of each of the breaking elements 15 is a nozzle 20, which emits a jet of high-pressure water 22. The tool 10 is additionally coupled to a retaining chain 24, which can be used to retrieve the tool 10 in the event that it encounters an obstacle, or to draw other tools or sections of replacement pipe into the cavity 17 of the existing pipe 12 behind the tool 10.

A high-pressure hose 26 is coupled to the tool 10 and is operative to supply high-pressure water to the nozzles 20. The hose 26 is drawn through the existing pipe 12 by tool 10.

The jets of high-pressure water 22 are operative to wash away soil and fragments 13 of broken pipe and to moisten and soften the surrounding soil. The soil and fragments 13 fall into the cavity of the existing pipe 12.

The expansion of the cavity 17 of the existing pipe 12 and the replacement of pipe 12 with a larger diameter pipe are facilitated by the washing away of soil and fragments 13 by the jets of high-pressure water 22. Once the tool 10 has fractured the existing underground pipe 12 and softened the surrounding soil, the expansion of the cavity 17 and the drawing into place of a replacement pipe can be performed by a separate device, which can be coupled to the retaining chain 24 and drawn behind the tool 10 (not shown). As persons skilled in the art are aware, there are several prior art tools suitable for expanding the cavity 17 and drawing in replacement pipe.

In alternative embodiments the nozzles 20 emit high-pressure air or fluids other than water. In an embodiment wherein the nozzles 20 emit high-pressure air, hose 26 would obviously be coupled to a compressor.

Figure 2:
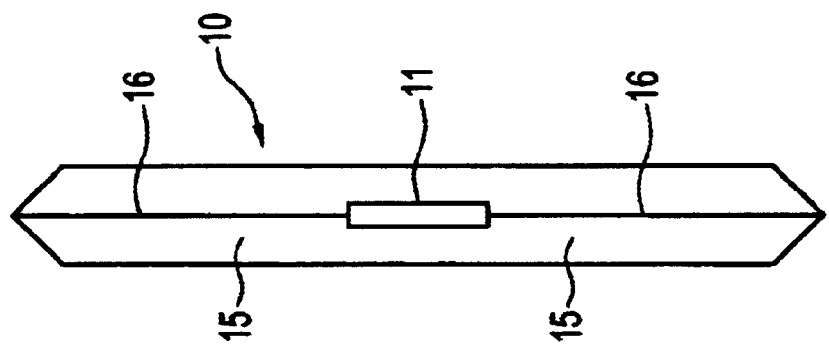
FIG. 2 is an end view of the nose of the tool of the present invention.
Figure 4:
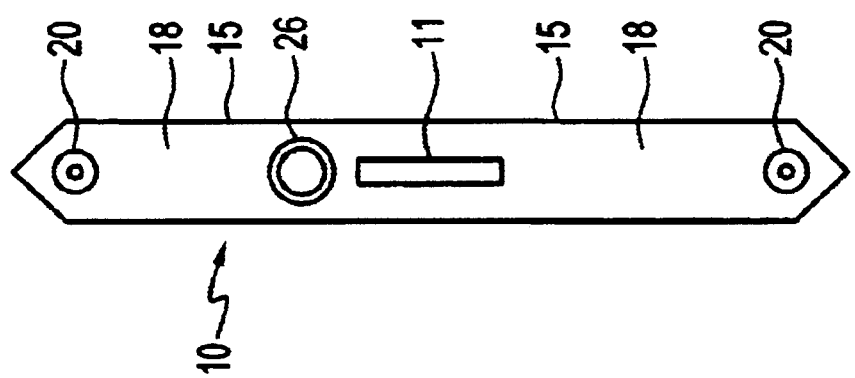
FIG. 4 is an end view of the rear portion of the tool of the present invention.

Referring to FIGS. 2 and 4, the tool 10 is shown from the front and rear, respectively. In FIG. 2 can be seen breaking elements 15, extending in opposite directions, and breaking edges 16. In FIG. 4 can be seen rearward-facing edge 18 of each of the breaking elements 15, nozzles 20 and high-pressure hose 26.

Figure 3:
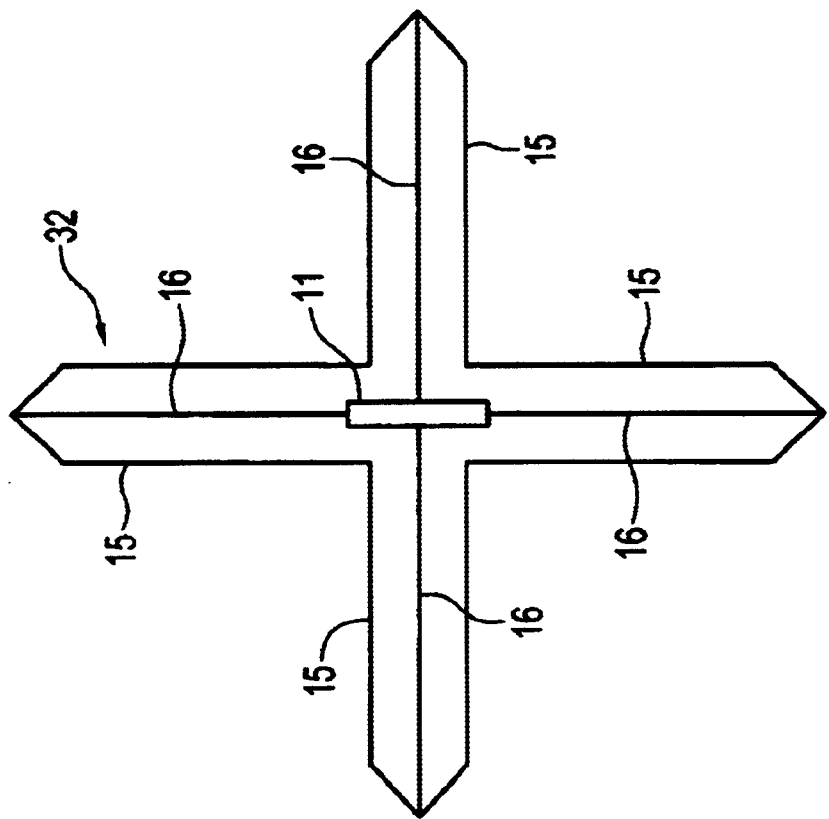
FIG. 3 is an end view of the nose of an alternate embodiment of the tool of the present invention.
Figure 5:
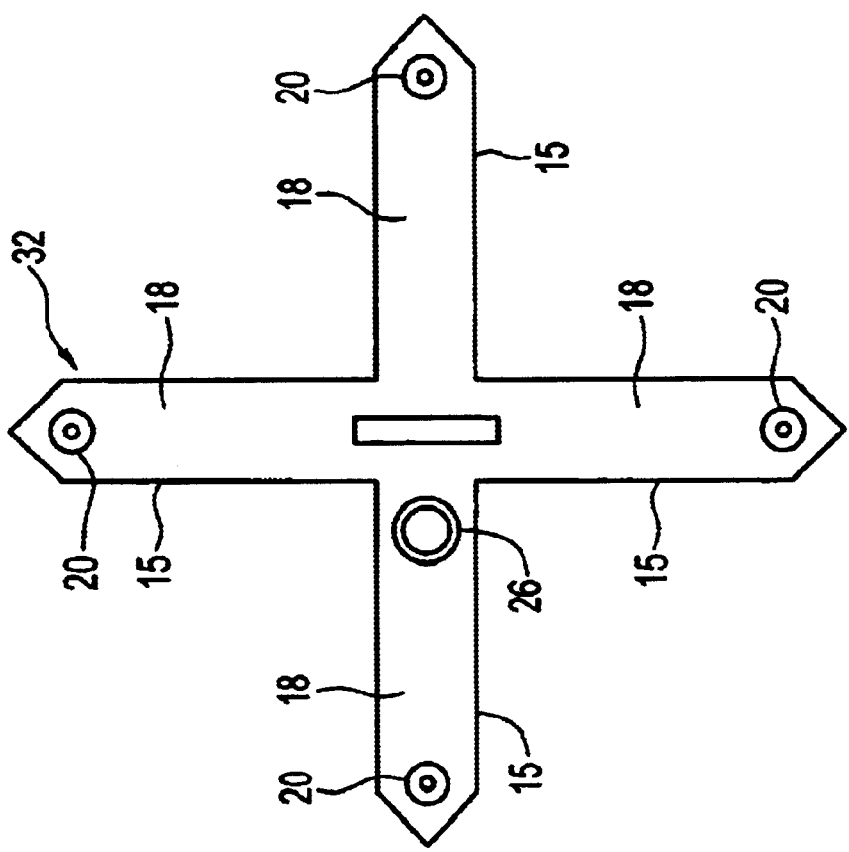
FIG. 5 is an end view of the rear portion of an alternate embodiment of the present invention.

Referring to FIGS. 3 and 5, an alternate embodiment 32 of the tool of the present invention, comprising four breaking elements 15, is shown from the front and rear, respectively. The alternate embodiment 32 has many of the same features as the first embodiment of tool 10 shown in FIG. 1. For example, the alternate embodiment 32 comprises breaking elements 15, breaking edges 16, nose coupler 11, nozzles 20, and a high-pressure hose 26.

Referring to FIGS. 1–5, the two embodiments of the tool 10, 32 additionally comprise internal channels (not shown), connected to the high-pressure hose 26, that direct high-pressure water to the nozzles 20.

The present invention contemplates alternate embodiments of the tool 10 wherein the nozzles 20 are angled inwardly or outwardly, or wherein the angle of the nozzles is adjustable, or wherein the nozzles oscillate and/or rotate.

In the embodiments described above, the nozzles 20 are located on the rearwardly facing edges 18 of the breaking elements 15, such that, as the tool 10, 32 is drawn through the existing pipe 12, the nozzles 20 are outside the wall of the existing pipe 12 (see FIG. 1). Alternatively, the nozzles 20 could be located closer to the central longitudinal axis of the tool 10 and angled outwards.

In the preferred embodiment, the jets of high-pressure water 22 are emitted from the nozzles 20 at approximately 2,500 psi. However, the pressure may be adjusted according to the density of the surrounding soil, the soil type, the type of pipe being replaced, and depending how much larger the replacement pipe is than the existing underground pipe The various embodiments of this invention can be used in the replacement of concrete, clay, cast iron, plastic pipes, other types of pipe.

Although the embodiments herein described comprise either two or four breaking elements 15, the present invention contemplates further embodiments having other numbers of breaking elements 15.

The present invention contemplates an embodiment of the tool 10 wherein the breaking elements 15 are curved such that the tool 10 has a spiral configuration. Such an embodiment would rotate about the central longitudinal axis when drawn through the existing pipe 12. Such an embodiment may additionally comprise a rotatable fitting to couple the high-pressure hose 26 to the tool 10.

The present invention additionally contemplates a method whereby the tool 10 is used to break up existing underground pipe 12 so that it can be replaced with larger diameter pipe. The first step is to access the existing underground pipe 12. This is normally done by excavating two holes in order to expose the existing pipe 12 at two spaced-apart points. A wire or similar object is inserted into the existing pipe 12 at one of the excavated points until it exits at the other excavated point. The wire is then used to draw a pulling chain 14 through the existing pipe 12. One end of the pulling chain 14 is then connected to the coupler 11 of the tool 10 and the other end is connected to a winch, hydraulic ram, or other pulling device. A retaining chain 24 and a high-pressure hose 26 are then connected to the rear end of the tool 10. At this point the pulling chain 14, the tool 10 and the retaining chain 24 can then be drawn through the existing pipe 12, in the process breaking up the existing underground pipe 12 and washing and softening the surrounding soil. The replacement pipe can be drawn into place behind the tool 10 or at a later point in time.

Alternatively, the preferred method is to couple an expanding head (not shown) to the retaining chain 24 and to draw it through the existing underground pipe behind the tool 10. The expanding head can be one of a number of prior art heads, often frusto-conical in shape, that are operative to expand the cavity 17 of the existing pipe 12 when drawn through the existing pipe 12. Such expanding heads incorporate means for coupling to the replacement pipe so that the replacement pipe is drawn into the expanded cavity.

Figure 6:
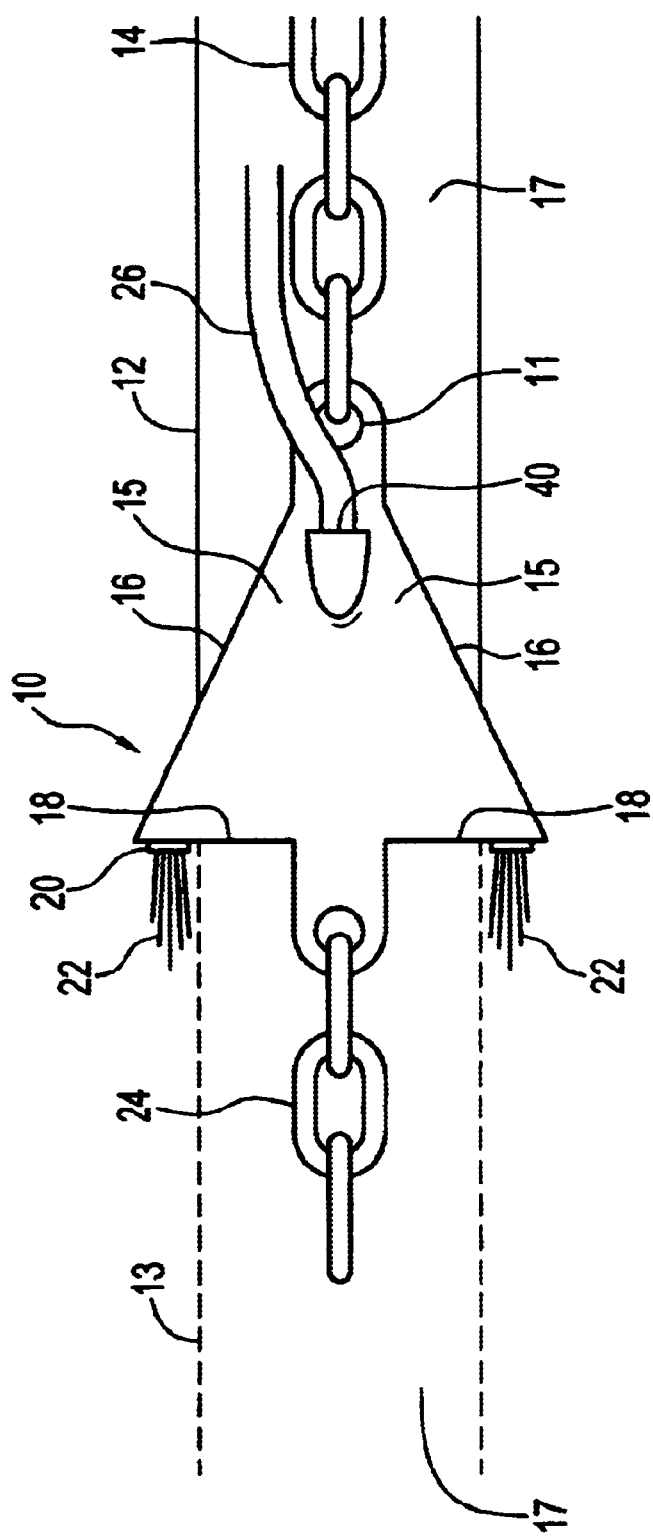
FIG. 6 is a side view of an alternative embodiment of the tool of the present invention wherein the high-pressure hose is connected to the nose of the tool.

Referring to FIG. 6, an alternative embodiment of the tool 10 is shown wherein the high-pressure hose 26 is connected to the coupler 40 on the nose of the tool 10. In this embodiment the high-pressure hose 26 is drawn through the existing pipe 12 along side the pulling chain 14 and ahead of the tool 10.

Figure 7:
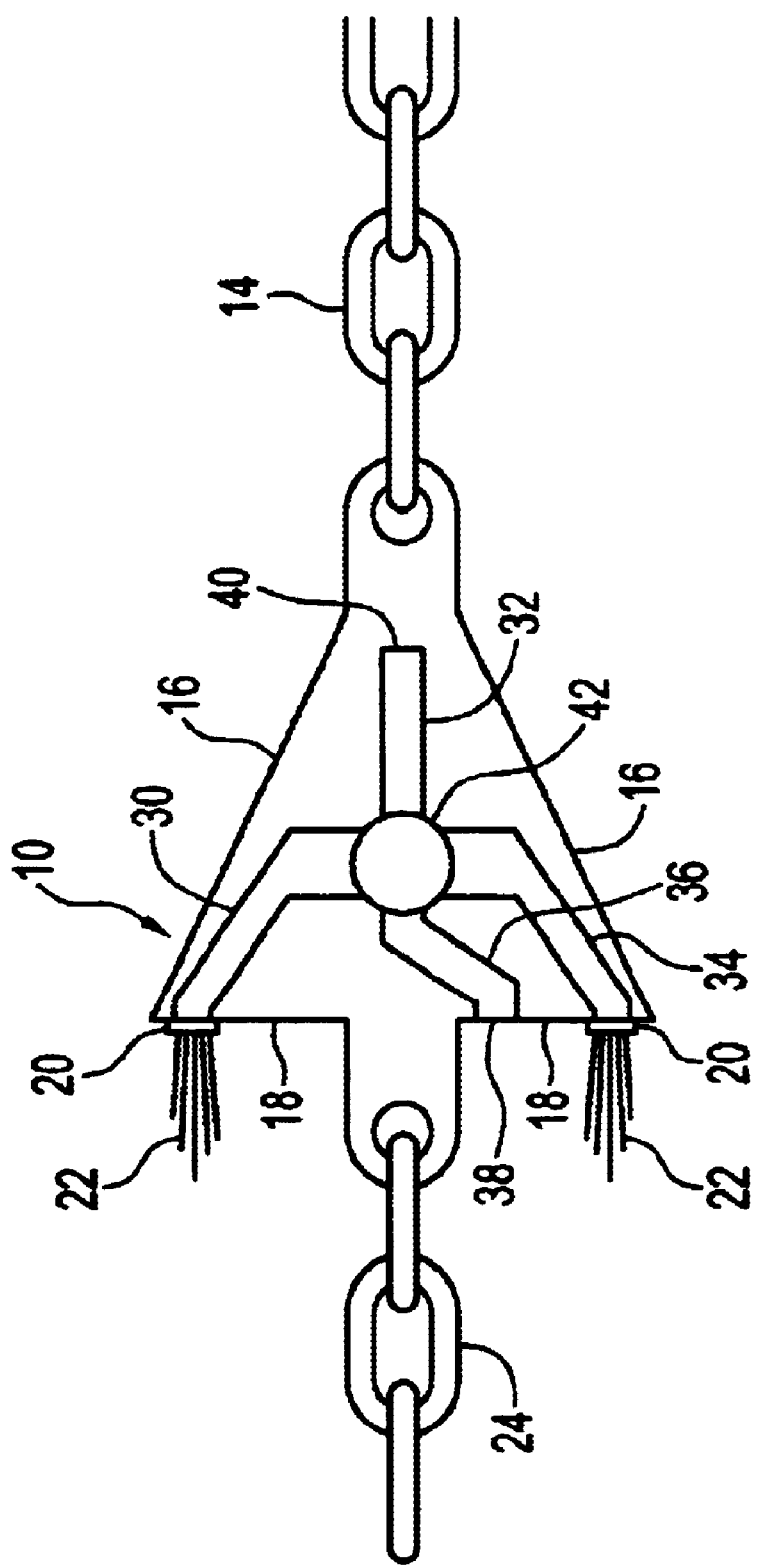
FIG. 7 is a cut away side view of a preferred embodiment of the present invention showing internal channels and a valve.

Referring to FIG. 7, a cut away view of the preferred embodiment of the tool 10 is depicted, showing a high-pressure system comprising internal channels 30, 32, 34, 36, coupling points 38, 40 and valve 42. The internal channels 30, 32, 34, 36 are operative to direct high-pressure fluid or air from the high-pressure hose 26 (not shown) to the nozzles 20. The embodiment depicted in FIG. 7 is capable of coupling to a high-pressure hose at either of coupling points 38 or 40. Coupling points 38 and 40 are similar to coupling points 38 and 40 in FIGS. 1 and 6, respectively. In the preferred embodiment, the tool 10 additionally comprises a valve 42. Valve 42 is operative to select between coupling points 38 and 40 as the source of high-pressure fluid or air for the nozzles 20. For example, if the high-pressure hose is connected to coupling point 38, the valve 42 can be switched to a position wherein air or fluid from coupling point 38 and internal channel 36 is directed to internal channels 34 and 30 and to nozzles 20. Furthermore, if the high-pressure hose is connected to coupling point 40, the valve 42 can be switched to a position wherein air or fluid from coupling point 40 and internal channel 33 is directed to internal channels 34 and 30 and to nozzles 20. As is obvious to anyone skilled in the art, the present invention contemplates alternative embodiments of the tool 10 lacking valve 42 and operative to receive high-pressure air or fluid from only one of coupling points 38 and 40.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. A tool for replacement of underground pipe, having a central longitudinal axis, said tool comprising:
    a) a nose having an outside diameter smaller than an inside diameter of said underground pipe and having a nose coupler operative to couple to a pulling chain;
    b) a rear portion having a rear coupler operative to couple to a retaining chain;
    c) a plurality of pipe breaking elements extending radially outwardly from said central longitudinal axis, operative to engage and to fracture or cut said underground pipe as said tool is drawn through said underground pipe;
    d) a high-pressure system having a coupling point connected to a plurality of nozzles by internal channels, wherein said coupling point is operative to couple to a high-pressure hose and to receive high-pressure fluid or gas from said high-pressure hose, said internal channels operative to convey the high-pressure fluid or gas to said nozzles, wherein said nozzles are on said rear portion of said tool, and wherein said nozzles are operative to emit jets of the high-pressure fluid or gas rearwardly from said tool against pipe fragments and against soil surrounding the underground pipe when said tool is drawn through the underground pipe.

2. The tool of claim 1, wherein one of said nozzles is located on each one of said breaking elements.

3. The tool of claim 1, wherein said tool comprises two of said breaking elements.

4. The tool of claim 1, wherein a distance between each one of said nozzles and the central longitudinal axis is greater than a radius of the underground pipe.

5. The tool of claim 1, wherein said breaking elements are parallel to the central longitudinal axis.

6. The tool of claim 1, wherein said nozzles are angled away from the central longitudinal axis.

7. The tool of claim 1, wherein said nozzles are operative to one of rotate and oscillate.

8. The tool of claim 1, wherein each of said nozzles emits a jet of fluid at 2500 psi.

9. The tool of claim 1, wherein the central longitudinal axis passes through a center of said nose and said rear portion.

10. The tool of claim 1, wherein an expanding tool is coupled to said retaining chain, and wherein, as said tool is drawn through the underground pipe, said retaining chain is operative to draw said expanding tool through the underground pipe behind said tool, said expanding tool operative to expand a cavity of the underground pipe and to draw replacement pipe into place.

11. The tool of claim 1, wherein said high-pressure hose is connected to a compressor and said nozzles are operative to emit jets of high-pressure air.

12. The tool of claim 1, wherein the fluid emitted from said nozzles is water.

13. The tool of claim 1, wherein said coupling point of said high-pressure system is on said nose of said tool.

14. The tool of claim 1, wherein said high-pressure system has a first coupling point, a second coupling point, a plurality of internal channels, and a valve, said first and second coupling points located on said nose and said rear portion of said tool, respectively, each of said first and second coupling points operative to couple to said high-pressure hose and to receive high-pressure fluid or gas from said high-pressure hose, said internal channels operative to convey the high-pressure fluid or gas from said first and second coupling points to said nozzles, and wherein said valve is operative to select between a first state and a second state, wherein when said valve is in said first state said valve is operative to receive high-pressure fluid or air from said first coupling point and direct said fluid or air to said nozzles, and wherein when said valve is in said second state said valve is operative to receive high-pressure fluid or air from said second coupling point and direct said fluid or air to said nozzles.

15. A tool for the replacement of an underground pipe, said tool having a central longitudinal axis, wherein said tool comprises:
    a) a nose having an outside diameter smaller than an inside diameter of the underground pipe, said nose additionally having a nose coupler for coupling to a pulling chain;
    b) a rear portion having a rear coupler for coupling to a retaining chain;
    c) a plurality of breaking elements extending along the central longitudinal axis from said nose to said rear portion, each of said breaking elements extending radially outward from the central longitudinal axis and defining a breaking edge, said breaking edge angled outwardly from said central longitudinal axis such that a distance between said breaking edge and the central longitudinal axis increases with a distance from said nose, and wherein a distance from said central longitudinal axis to outermost points of said breaking edges is greater than a radius of the underground pipe, and wherein said breaking edges are operative to fracture or cut the underground pipe as said tool is drawn through the underground pipe, each of said breaking elements additionally defining a rearward facing edge;
    d) a plurality of nozzles on said rearward facing edges of said breaking elements, said nozzles operative to emit jets of high-pressure fluid rearwardly against pipe fragments and against soil surrounding the underground pipe when said tool is drawn through the underground pipe; and
    e) a coupling point operative to couple to a high-pressure hose, said high-pressure hose operative to supply high-pressure fluid to said nozzles, and wherein said high-pressure hose is drawn through the underground pipe behind said tool.

16. A method for replacing underground pipe, comprising:
a) providing the tool of claim 1;
b) excavating first and second spaced-apart points along the underground pipe;
c) feeding said pulling chain through the underground pipe and coupling said pulling chain to said nose coupler of said tool at said first spaced-apart point;
d) coupling said retaining chain to said rear coupler;
e) coupling said high-pressure hose to said coupling point;
f) supplying a high-pressure fluid to said high-pressure hose;
g) drawing said tool through the underground pipe from said first spaced-apart point to said second spaced-apart point by applying tension to said pulling chain, wherein said tool is operative to fracture or cut the underground pipe and wash away soil and fragments surrounding the underground pipe and to soften the soil surrounding the underground pipe.

17. The method of claim 16, wherein an expanding tool is coupled to said retaining chain, and wherein, as said tool is drawn through the underground pipe, said retaining chain is operative to draw said expanding tool through the underground pipe behind said tool, said expanding tool operative to expand a cavity of the underground pipe and to draw replacement pipe into place.

18. The method of claim 16, wherein each of said nozzles emits a jet of fluid at 2500 psi.

19. The method of claim 16, wherein said high-pressure hose is connected to a compressor and wherein said nozzles emit jets of high-pressure air.

20. The method of claim 16, wherein said method is repeated a plurality of times along a length of the underground pipe.

21. The method of claim 16, wherein said tool is withdrawn from the underground pipe by applying tension to said retaining chain.

22. The method of claim 16, wherein said coupling point is on said nose of said tool.

* * * * *